TAPE CARTRIDGE AND DRIVING MECHANISM FOR THE TAPE

Filed Oct. 18, 1967 2 Sheets-Sheet 1

TAPE CARTRIDGE AND DRIVING MECHANISM FOR THE TAPE

Filed Oct. 18, 1967

3,520,495

TAPE CARTRIDGE AND DRIVING MECHANISM FOR THE TAPE

Tadashi Sotani, 21-1 5-chome, Denenchofu, Ohta-ku, Tokyo, Japan

Filed Oct. 18, 1967, Ser. No. 676,161
Claims priority, application Japan, Oct. 29, 1966, 41/71,030, 41/99,735; Aug. 8, 1967, 42/67,836
Int. Cl. G11b *15/32, 23/10*
U.S. Cl. 242—192 4 Claims

ABSTRACT OF THE DISCLOSURE

A tape cartridge having two spools connected together for movement in a spaced relation to each other therewithin, and a tape driving mechanism for winding the tape onto the take-up spool, the driving means including capstan means engaging the periphery of the take-up spool to wind the tape thereon and pressure means engaging the periphery of the feed spool and being effective through the feed spool and spool connector means to urge the take-up spool against the capstan means.

This invention relates to a tape cartridge, and more specifically to a novel and improved tape cartridge wherein the feed and take-up spools are movable, maintaining a certain spaced relationship therebetween, in the longitudinal direction of the cartridge, and to a driving mechanism for the tape.

Tape cartridges have enjoyed diversified applications in machines, apparatus and appliances using tapes, for example magnetic recording and reproducing devices, video tape recorders, movie cameras, communication equipment, and computers, because they provide convenience in storing and transporting tapes and simplify the tape loading and unloading. To make these machines, apparatus and appliances more compact in design and smaller in size than at present, miniaturization of the tape cartridges is essential and is being called for for that reason.

In conventional tape cartridges, the spindles of feed and take-up spools are both secured fixedly and therefore the space between each spindle and the adjacent side wall of the cartridge must be at least equal to the maximum roll radius R of the total length of a tape wound on the particular spool. Assuming now that the distance between the two spindles is twice as large as the roll radius $r$ of each of the equally divided lengths of the tape on the spools, the longitudinal length L of the cartridge would be $$L>2R+2r(R>r)$$

thus making it inevitable to use large-size cartridges. As a result, the machines, apparatus, and appliances using such cartridges, for example magnetic recording and reproducing devices, have had to be increased in the overall dimensions to a practical disadvantage.

Accordingly it is a principal object of the present invention to eliminate the above disadvantage and provide a novel and improved tape cartridge.

Another object of the invention is to provide a tape cartridge wherein two spools for winding a tape in spaced relationship can move together within the cartridge in the direction longitudinal thereof.

Another object of the invention is to provide a tape cartridge wherein two spools are so disposed that their spindles protrude in common arcuate guide slots which are provided on the upper and lower panels of the cartridge and extend longitudinally thereof, and the spindles are connected together by connecting members so that the spools are maintained in a certain spaced relationship.

Another object of the invention is to provide a tape cartridge wherein two spools are kept apart a distance slightly greater than twice the roll radius of tape wound in equivalent lengths on the spools and so disposed as to be movable together along the guide slots, whereby the longitudinal dimension of the tape cartridge can be limited to about four times the roll radius of the tape on each spool.

Another object of the invention is to provide a tape driving mechanism adapted to drive the tape in the cartridge and which is simple in construction.

Another object of the invention is to provide a tape driving mechanism for driving the tape at a predetermined rate without resorting to any special means.

Another object of the invention is to provide a tape driving mechanism which causes rotation of either of the two spools by directly imparting a rotating force to the periphery of the roll of tape wound therearound.

Another object of the invention is to provide a tape driving mechanism which presses the periphery of the roll of tape wound around either of the two spools thereby to bring the periphery of the roll of tape wound on the other spool into pressure contact with a driving roller.

Still another object of the invention is to provide a tape driving mechanism which presses the periphery of the roll of tape wound on the feed spool with a free roller thereby to bring the periphery of the roll of tape wound on the take-up spool into pressure contact with a driving roller.

Other objects and advantages of the present invention will become apparent from the following detailed description taken in conjunction with the accompanying drawings, in which.

Figure 1:
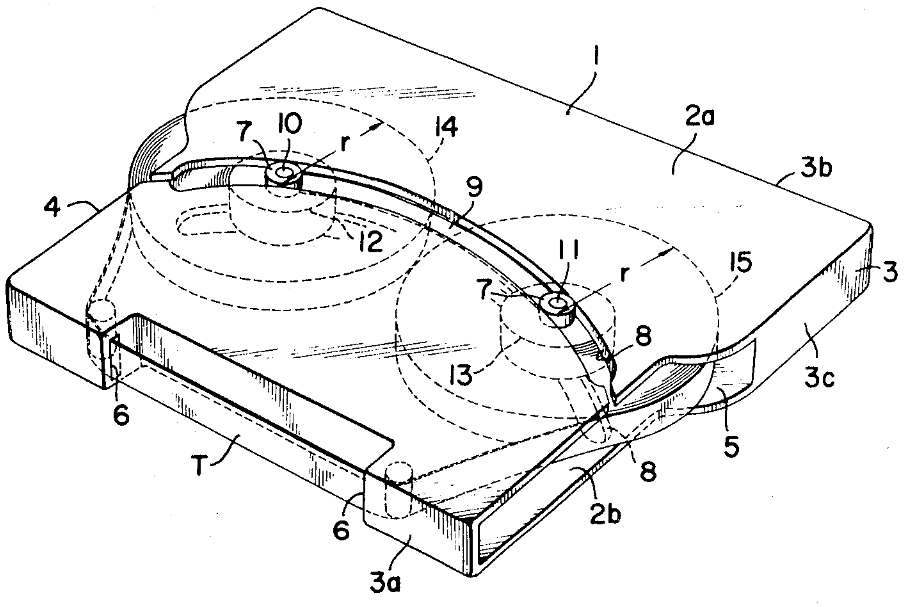
FIG. 1 is a perspective view of a form of tape cartridge according to the present invention.

Referring specifically to FIG. 1, a substantially rectangular tape cartridge embodying the present invention is shown which comprises a cartridge body 1 formed of a laterally extended upper panel 2*a* and a corresponding lower panel 2*b* and a surrounding wall 3 which connects the panels together. The surrounding wall includes a front wall 3*a*, rear wall 3*b*, and side walls 3*c*. The upper and lower panels are each formed with a longitudinally extending arcuate guide slot 8. The side walls 3*c* are provided with openings 4 and 5, respectively. The front wall 3*a* is formed with a pair of tape outlet ports 6 in spaced relationship. The tape is indicated at T. Two spools 12 and 13 are disposed in the space defined by the upper panel 2*a* and the lower panel 2*b* and have spindles 10 and 11, respectively, which protrude into the guide slots 8. Each of connecting members 9 has at both ends bearings 7 and 7, which rotatably support the spindles 10 and 11 of the spools, so that the spools 12 and 13 can be kept apart from each other a distance slightly more than twice the roll radius $r$ of the tape T when wound in equal lengths 14 and 15 on the spools. Thus the two spools can always move together along the guide slots while being kept in a certain spaced relationship. Accordingly, the cartridge is required to have a longitudinal dimension only about four times greater than the roll radius $r$.

Figure 2:
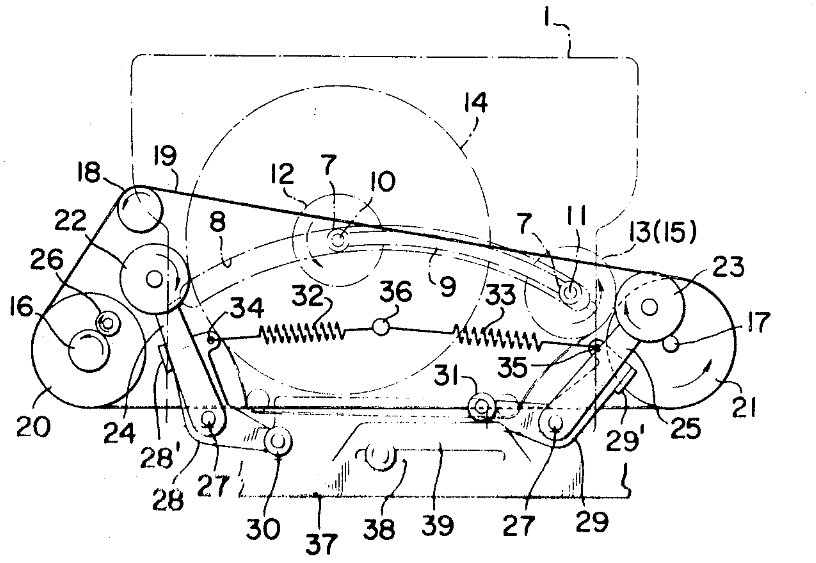
FIG. 2 is a plan view explanatory of the relationship between the tape cartridge shown in FIG. 1 and a tape driving mechanism therefor.

In FIG. 2 there is shown a mechanism adapted to drive the tape in the cartridge of the construction described above, in connection with the tape cartridge. The mechanism includes a rewinding capstan 16 and a take-up capstan 17. These capstans are provided on pulleys 20 and 21 which serve as fly wheels and are rotatingly driven by an endless belt 19 which is stretched around a driving pulley 18 and the pulleys 20 and 21. Rewinding pinch roller 22 and take-up pinch roller 23 are rotatably supported, respectively, at the front ends of support levers 24 and 25 which are pivotally connected to pins 27. The rewinding pinch roller 22 is adapted selectively to contact either a counter roller 26 normally in contact with the rewinding capstan 16 and the periphery of the roll of tape wound on the feed spool 12 or only the tape wound on the spool 12. The take-up pinch roller 23 is adapted selectively to contact either the take-up capstan 17 and the periphery of the roll of tape wound on the take-up spool 13 or only the tape wound on the periphery of the roll of tape. Generally L-shaped change-over arms 28 and 29 are disposed opposite to each other, with their bends pivotally supported by the pivots 27 for the support levers 24 and 25. The change-over arms 28 and 29 are provided at one end with projections 28' and 29' which engage with the outer edges of the support levers 24 and 25 and are also provided at the other ends with rolls 30 and 31 in a rotatable way. Springs 32 and 33 are connected at one end to holes 34 and 35 formed on one end of each of the change-over arms 28 and 29 and are connected at the other ends to a fixed pin 36 secured to the case (not shown), so that the springs can urge the support levers 24 and 25 inwardly. Change-over bar 37 is formed with a slot 38 and a cam extension 39 and is freely slidable in longitudinal direction guided by the slot 38. Thus, the cam extension 39 of the change-over bar 37 can come into contact with either roll 30 or 31 and keep the change-over arm 28 or 29 in the outward position against the force of spring 32 or 33.

Assuming now that the change-over bar 37 is shifted leftward as viewed in FIG. 2, the roll 31 will then be disengaged from the cam extension 39 and the support lever 25 will be turned inwardly since projection 29' on the change-over arm 29 is urged inwardly by the spring 33. On the other hand, the roll 30 will be engaged with the cam extension 39 and force the change-over arm 28 outwardly with the result that the support lever 24 will be liberated from the projection 28' on the arm 28. Thus, if the tape cartridge is mounted on an apparatus which cooperates therewith and a motor (not shown) starts to rotate the driving pulley 18, the pulleys 20 and 21 will be driven by way of the belt 19 and the coaxial take-up capstan 17 and rewinding capstan 16 will also begin running. If the change-over lever 37 si shifted rightward as shown in FIG. 2, the cam extension 39 will come into engagement with the roll 31 and force it upward, thus turning the change-over arm 29 outwardly or clockwise around the pivot 27 and against the force of spring 33. as the result, the projection 29' of the change-over arm 29 will move away from the support lever 25 and liberate the latter. Meanwhile, the other roll 30 will roll down the cam extension 39 and the change-over arm 24 will be pulled by the spring 32 to turn inwardly or clockwise around the pivot 27. Accordingly, the support lever 24 will also be turned clockwise together with the change-over arm 28 around the common pivot 27 by means of the projection 28' of the arm which engages with the lever. By this pivotal movement of the support lever 24, the rewinding pinch roller 22 will be brought out of contact with the counter roller 26 which normally contacts the rewinding capstan 16 and in contact with the periphery of the roll of tape T wound on the feed spool 12 via the opening 4 of the cartridge, thereby exerting a pressure upon the periphery of the tape roll. Since the spindles 10 and 11 are linked by the connecting members 9, the feed spool 12 and take-up spool 13 will be both urged rightward along the guide slots 8 to bring the periphery of the roll of tape wound on the take-up spool 13 into pressure contact with the pinch roller 23 and also bring the pinch roller 23 into pressure contact with the take-up capstan 17. Thus, the revolution of the capstan 17 will be transmitted to the pinch roller 23 so as to rotate the spool 13 through the surface contact between the running pinch roller 23 and the periphery of the roll of tape, thereby delivering the tape in the winding direction. As the delivery of tape proceeds, the amount of tape wound on the take-up spool 13 will be increased and the amount of tape on the feed spool 12 will decrease. Thus the spools 12 and 13 will gradually be moved leftward because the spindles thereof are guided together with the connecting members 9 along the guide slots 8. Since the rewinding pinch roller 22 normally exerts a pressure upon the periphery of the roll of tape wound on the feed spool, the periphery of the roll of tape on the take-up spool will be urged by the pinch roller 23 into pressure contact with the take-up capstan 17. As the consequence, the delivery of the tape in the winding direction will be continued until a moment before the tape on the feed spool is completely exhausted. Because the rotation of the take-up spool is accomplished by the contact between the periphery of the roll of tape wound on the spool and the roller 23, it will be obvious that the tape being taken up is always delivered at a constant speed irrespective of the amount of tape wound on the feed spool.

Next, if the change-over lever 37 is shifted to the opposite position or leftward, the roll 30 on the changeover arm 28 will be urged upwardly as it is engaged with the cam extension 39, whereby the change-over arm 28 will be turned counter-clockwise and kept in that position against the force of the spring 32. On the other hand, the roll 31 of the change-over arm 29 will be set free from the cam, and the change-over arm 29 will be turned counter-clockwise by the pull of the spring 33. Thus, the support lever 25 will also be turned counter-clockwise with the projection 29' of the change-over arm 29, thus pushing the pinch roller 23 away from the take-up capstan 17 and into pressure contact with the periphery of the roll of tape wound on the take-up spool 13 through the opening 5 of the cartridge, so that the spool 13 can be urged leftward. By the leftward movement of the take-up spool 13, the feed spool 12 will also be moved leftward to press the rewinding pinch roller 22 by way of the periphery of the roll of tape 14 wound on the feed spool 12 in order thereby to press it into contact with the counter roller 26 which engages the rewinding capstan 16. Thus, the rewinding pinch roller 22 will be imparted a rewinding torque from the rewinding capstan 16, and will rotate the spool 12 by surface contact between the pinch roll 22 and the periphery of the roll of tape wound on the feed roll, thereby delivering the tape at a relatively high speed in the rewinding direction. With the progress of the tape delivery, the amount of the tape wound on the feed spool will increase while the amount of tape on the take-up spool will decrease, and accordingly the spindles 10 and 11 of both spools linked by the connecting members 9 will be guided together from left to right along the guide slots 8.

Figure 3:
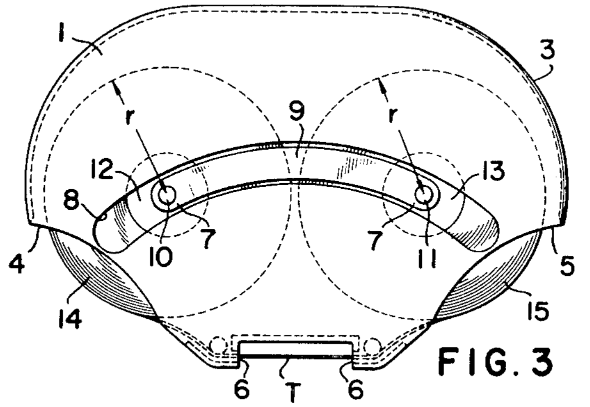
FIG. 3 is a plan view of another form of tape cartridge according to the invention.

FIG. 3 shows another form of tape cartridge embodying the present invention. It is substantially of the same construction as the first embodiment above described except that the rear corners of the cartridge are formed arcuately so as to reduce the overall volume.

Figures 4, 5:
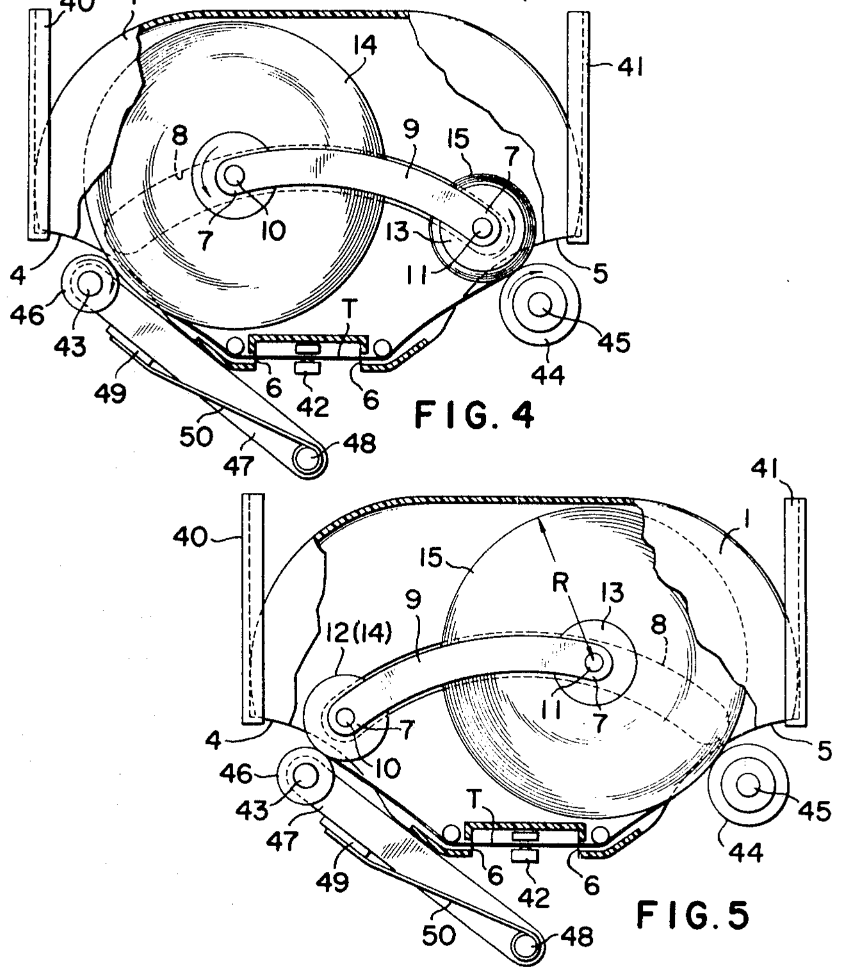
FIGS. 4 and 5 are partly sectional plan views explanatory of the relationship between the tape cartridge shown in FIG. 3 and the tape driving mechanism therefor, FIG. 4 illustrating the combination at the start of tape winding and FIG. 5 at the close of tape winding.

FIGS. 4 and 5 show another embodiment of the tape driving mechanism. This mechanism is simplified in construction as it comprises only one capstan 44 which is driven by a motor (not shown), and a free roller 46 for exerting contact pressure. The tape is of the two-track type capable of audio or video recording in one reciprocating cycle, and the tape cartridge after one-way recording can be mounted upside down on the recorder so that the two tracks on the tape can be alternately used. In FIGS. 4 and 5, the tape cartridge is mounted on a machine, apparatus, or appliance (e.g. a magnetic sound recorder-reproducer) with guide frames 40 and 41. The tape T which is exposed through the outlets 6 and 6 is stretched in such manner that one of the tracks thereon can face a recording-reproducing head 42. The periphery of the roll 15 of tape T wound on the take-up spool 13 is kept in contact through an opening 5 with a capstan 44 on a spindle 45 which is supported by the machine frame and is driven by a motor (not shown). On the other hand, the periphery of the roll 14 of tape on the feed spool 12 is in contact with a free pressure roller 46 by way of an opening 4 in the cartridge. The free pressure roller 46 is pivotally supported at one end 43 of a support arm 47 which is pivotally connected at the other end to the machine frame (not shown) by a pivot 48. The support arm 47 is normally urged in the clockwise direction around the pivot by a spring 50 which is connected at one end with the pivot 48 and at the other end with a projection 49 of the support arm 47. By the clockwise movement of the support arm the free pressure roller 46 presses the periphery of the roll of tape 14 wound on the feed spool 12, with the result that the periphery of the roll of tape 15 wound on the take-up spool 13 is kept in pressure contact with the capstan 44 and, by the rotation of the capstan 44, winds the tape gradually around the spool 13. When the total length of tape has been taken up as shown in FIG. 5, the operator removes the tape cartridge from the guide frames 40 and 41, turns it upside down, and remounts it on the machine with the guide frames. Then, the cartridge will again be disposed as shown and recording or reproduction will be accomplished in the same way as described above.

With the construction and functions as described herein above, the present invention enables the size of tape cartridges to be minimized for the volume of tape to be accommodated, and hence permits reduction in size of the machines, apparatus, and appliances which employ such tape cartridges. In addition to these advantages, the invention insures constant tape speeds irrespective of the changes in the amounts of tape on the spools because a roller is directly kept in contact with the periphery of the roll of tape wound on the take-up spool thereby to rotate the take-up spool. Thus, the invention eliminates the necessity of friction clutches and the like and contributes greatly to the miniaturization of the tape driving mechnism.

What is claimed is:

1. In combination with a tape cartridge comprising a cartridge body including upper and lower panels, said body being formed with openings on both sides thereof, a feed spool and a take-up spool disposed inside the cartridge body and on which a tape can be wound in rolls, said cartridge body being provided with longitudinally extending arcuate guide slots in the upper and lower panels thereof, spindles supporting the spools extending into the arcuate guide slots, and connecting means for supporting said spool spindles in connected relationship and in such way that when the tape has been wound in equal amounts on both spools the spools are separated from each other by a distance greater than twice the roll radius of the tape on either spool, the two spools movable together along the guide slots, a tape driving mechanism comprising take-up and rewinding capstans, pinch rollers adapted for contacting the peripheries of rolls of tape wound on both spools through the openings of the cartridge and also for contacting both of the capstans, pivotally connected support arms for supporting the pinch rollers, pulling means for pivotally moving the support arms relatively toward each other and selectively bringing one of the pinch rollers away from the corresponding capstan, means for alternately actuating said pulling means with respect to the support arms, whereby one of the pinch rollers is freed from the pulling means and the other pinch roller is moved away from the corresponding capstan and is brought into pressure contact with the periphery of the roll of tape wound on the corresponding spool while the other pinch roller in contact with the periphery of the roll of tape on the other spool is brought into pressure contact with the capstan corresponding thereto.

2. In combination with a tape cartridge comprising a cartridge body including upper and lower panels, said body being formed with openings on both sides thereof, a feed spool and a take-up spool disposed inside the cartridge body and on which a tape can be wound in rolls, said cartridge body being provided with longitudinally extending arcuate guide slots in the upper and lower panels thereof, spindles supporting the spools and extending into the arcuate guide slots, and connecting means for supporting said spool spindles in connected relationship and in such way that when the tape has been wound in equal amounts on both spools the spools are separated from each other by a distance greater than twice the roll radius of the tape on either spool, the two spools being thereby movable together along the guide slots, a tape driving mechanism comprising a capstan which contacts the periphery of the roll of tape wound on the take-up spool through one of said openings thereby to rotate the take-up spool, and pressure means for engaging the periphery of the roll of tape wound on the feed reel through the other opening of the cartridge and being effective through the feed spool and connecting means to keep the periphery of the roll of tape on the take-up spool in pressure contact with the capstan.

3. The combination claimed in claim 2 wherein the pressure means includes an arm, a roll on said arm for engaging the roll of tape on said feed roll, and a spring acting on said arm to urge the roll thereon against the latter said roll of tape.

4. The combination claimed in claim 3 comprising means for mounting said cartridge for removal away from said pressure means whereby the cartridge can be inverted.

References Cited

UNITED STATES PATENTS

| | | |
|---|---|---|
| 2,804,508 | 8/1957 | Mastling et al. -- 242—55.13 X |
| 2,821,576 | 1/1958 | Gaubert. |
| 3,161,361 | 12/1964 | Lida. |
| 3,235,194 | 2/1966 | Willis. |
| 3,245,627 | 4/1966 | Lida. |
| 3,386,676 | 6/1968 | Sotani et al. ------ 242—55.13 |

GEORGE F. MAUTZ, Primary Examiner

U.S. Cl. X.R.

242—199